United States Patent
Nakayama

(10) Patent No.: US 8,111,027 B2
(45) Date of Patent: Feb. 7, 2012

(54) MOTOR DRIVE DEVICE

(75) Inventor: Hiroshi Nakayama, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 369 days.

(21) Appl. No.: 12/092,241

(22) PCT Filed: Oct. 31, 2006

(86) PCT No.: PCT/JP2006/322218
§ 371 (c)(1),
(2), (4) Date: Apr. 30, 2008

(87) PCT Pub. No.: WO2007/052816
PCT Pub. Date: May 10, 2007

(65) Prior Publication Data
US 2009/0096395 A1   Apr. 16, 2009

(30) Foreign Application Priority Data
Nov. 1, 2005   (JP) ................................. 2005-318504

(51) Int. Cl.
*H02P 6/08* (2006.01)

(52) U.S. Cl. .............. 318/400.15; 318/400.01; 318/434; 318/700

(58) Field of Classification Search ............ 318/400.01, 318/400.15, 434, 700
See application file for complete search history.

(56) References Cited

U.S. PATENT DOCUMENTS

| | | | |
|---|---|---|---|
| 5,376,868 A * | 12/1994 | Toyoda et al. ................ | 318/587 |
| 5,483,141 A | 1/1996 | Uesugi | |
| 5,923,135 A * | 7/1999 | Takeda .......................... | 318/432 |
| 6,018,198 A * | 1/2000 | Tsuzuki et al. .................. | 290/17 |
| 6,114,828 A * | 9/2000 | Matsunaga et al. .......... | 318/782 |
| 6,304,052 B1 | 10/2001 | O'Meara et al. | |
| 7,142,969 B2 * | 11/2006 | Inagaki .......................... | 701/70 |
| 7,383,902 B2 * | 6/2008 | Matsuzaki et al. ....... | 180/65.285 |

FOREIGN PATENT DOCUMENTS

| | | |
|---|---|---|
| DE | 42 15 228 A1 | 11/1993 |
| DE | 101 20 639 A1 | 1/2002 |
| JP | 6-178579 A | 6/1994 |
| JP | 7-322401 A | 12/1995 |
| JP | 8-191503 A | 7/1996 |
| JP | 11-122703 A | 4/1999 |
| JP | 2001103603 A | 4/2001 |

(Continued)

OTHER PUBLICATIONS

German Office Action dated Dec. 15, 2009 (with translation) (5 pages).

(Continued)

*Primary Examiner* — Bentsu Ro
*Assistant Examiner* — David Luo
(74) *Attorney, Agent, or Firm* — Sughrue Mion, PLLC

(57) ABSTRACT

The present motor control device detects from the speed of a motor and a current driving the motor that the motor is overloaded, and exerts control to set a target torque based on the detected overload state of the motor to cause the motor to output a maximal torque that the motor can output, intermittently within a preset allowable speed range. If the motor is overloaded, the motor's output torque is not decreased and a drive circuit can also be protected.

8 Claims, 6 Drawing Sheets

FOREIGN PATENT DOCUMENTS

| | | |
|---|---|---|
| JP | 2002-10696 A | 1/2002 |
| JP | 2003-114052 A | 4/2003 |
| JP | 2004350422 A | 12/2004 |
| JP | 2005-45863 A | 2/2005 |
| JP | 2005253200 A | 9/2005 |

OTHER PUBLICATIONS

Notice of Grounds of Rejection dated Mar. 29, 2011 for JP 2005-318504 (English translation) (4 pages).

* cited by examiner

MOTOR DRIVE DEVICE

TECHNICAL FIELD

The present invention relates to motor drive devices and particularly to motor drive devices capable of protecting drive circuits from overheating.

BACKGROUND ART

In recent years, hybrid vehicles and electric vehicles are gaining attention as environmentally friendly vehicles. A hybrid vehicle has, as a source of motive force, a conventional engine and in addition thereto a motor driven by a direct current power supply via an inverter. More specifically, the engine is driven to obtain a source of motive force and the direct current power supply also provides direct current voltage which is in turn converted by the inverter to alternate current voltage employed to rotate the motor to obtain a source of motive force.

An electric vehicle is a vehicle having as a source of motive force a motor driven by a direct current power supply via an inverter.

In such a hybrid vehicle or electric vehicle when a drive motor normally rotates an alternate current flows through each switching element of the inverter. However, if the vehicle has been ditched or the like and the motor has its rotor locked and thus stopped or rotates at a significantly low speed, a large direct current flows through a particular switching element and the element's heat loss will rapidly increase.

Means for preventing such overload on an inverter that is caused when a motor is locked or rotates at a significantly low speed have conventionally been studied. One such means is a technique limiting a torque that a motor outputs to limit an amount of a current flowing through a switching element of an inverter (see Japanese Patent Laying-Open Nos. 11-122703, 7-322401, 8-191503, and 2005-45863, for example).

However, if the drive motor is subjected to such output torque limitation and an immediately decreased output torque is provided then the vehicle cannot obtain force driving it, as desired, and cannot escape from a locked state or from rotating at a significantly low speed. For example if the vehicle is climbing uphill and the driver for example depresses the accelerator pedal in an insufficient amount, and the drive motor is thus locked, providing a limited output torque may cause the vehicle to fall downhill.

Accordingly for example Japanese Patent Laying-Open No. 11-122703 discloses an overload prevention device for an electric vehicle that contemplates preventing overload on an inverter without rapidly decreasing a torque output from a motor.

According to Japanese Patent Laying-Open No. 11-122703 the overload prevention device for an electric vehicle includes: temperature estimation means estimating the temperature of a bonded portion of each switching element from the value of the temperature of the switching element as detected; torque limitation value calculation means calculating a torque limitation value in accordance with the value of the temperature of a bonded portion of a conducting switching element as estimated; and control value limitation means limiting a torque control value by the torque limitation value when a motor rotates at a speed having a value, as detected, smaller than a predetermined value and the switching element's bonded portion has a temperature, as estimated, exceeding a predetermined value.

The torque limitation value calculation means identifies a conducting switching element from the position of a magnetic pole of the motor and calculates a torque limitation value in accordance with the value as estimated of the temperature of the bonded portion the conducting switching element, and when the control value limitation means limits the torque control value to at most the torque limitation value the conducting switching element's current is controlled to be a current output in accordance with the control value after the torque limitation.

Thus, when such torque limitation provides a decreased output torque, and the motor's conducting phase, i.e., the conducting switching element shifts to a switching element of an adjacent phase, a torque limitation value is calculated for the switching element that is now the conducting switching element. As the switching element that is now the conducting switching element has so far not conducted, its bonded portion has low temperature. Accordingly the torque limitation value therefor is high. Accordingly the output torque now increases.

Thus a torque control value is limited for each switching element in accordance with its bonded portion's temperature. As such if the motor is locked a rapidly decreased torque is not output. This can prevent the vehicle's occupant(s) from feeling uncomfortable.

As described in Japanese Patent Laying-Open No. 11-122703, however, the torque limitation value calculation means and the control value limitation means exert control on a precondition that the motor's magnetic pole positionally varies, i.e., the motor rotates. As such, if the motor's rotation is completely locked, a torque control value is necessitated to simply decrease from a maximal torque that is obtained when the inverter has passing therethrough a maximal current that it can pass, to a torque output from the motor as a maximal direct current that a particular switching element of the inverter can continuously tolerate is passed when the motor is locked (hereinafter the latter torque will also be referred to as a torque that can be continuously output). Thus, when the motor is locked, a rapidly decreased output torque will be provided, and a possibility arises that motive force required to escape from the locked state cannot be ensured.

Furthermore, the torque limitation value calculation means configured to identify a conducting switching element from the position of a magnetic pole of the motor and calculate a torque limitation value in accordance with the value as estimated of the temperature of a bonded portion the identified switching element, contributes to complicated contents for control. Furthermore, the torque is generated with a magnitude varying with the position of the magnetic pole of the motor, and it is still unavoidable that the driver of the vehicle feels uncomfortable.

The present invention has been made to overcome such disadvantage and it contemplates a motor drive device that can both prevent overload on an inverter and also ensure dynamic performance.

DISCLOSURE OF THE INVENTION

The present invention provides a motor drive device including: a power supply; a drive circuit receiving electric power from the power supply to drive a motor; and a control device controlling the drive circuit to match an output of the motor to a target torque. The control device includes an overload state detection unit detecting an overload state of the motor from the speed of the motor and a current driving the motor, and a motor output limitation unit operative in response to the overload state of the motor being detected to limit a torque output from the motor. The motor output limitation unit sets the target torque to cause the motor to output a maximal torque that the motor can output, intermittently within an allowed number of times having a preset predetermined range.

When the motor is in an overload state the motor drive device allows the motor to output a maximal torque that the motor can output, intermittently within a range preventing a drive circuit from overheating. Thus the drive circuit can thermally be protected, while the motor's maximal torque can effectively be utilized. As a result, the motor can maximally exhibit its ability to ensure dynamic performance.

Preferably the motor output limitation unit sets the target torque to cause the motor to output the maximal torque that the motor can output, for each prescribed period of time and within the allowed number of times having the predetermined range.

When the motor is in the overload state the motor drive device allows the motor to output the maximal torque for each prescribed period of time. This allows a simple control configuration to be employed to effectively utilize the motor's maximal torque.

Preferably the motor output limitation unit sets the allowed number of times so as to prevent the drive circuit from exceeding a prescribed tolerable value in temperature.

The motor drive device allows the motor to output the maximal torque an allowed number of times that is set with how much the drive circuit elevates in temperature taken into consideration. The drive circuit can be prevented from overheating, and reliability can be improved.

Preferably, when a decision is made that the motor has output the maximal torque the allowed number of times, the motor output limitation unit sets the target torque to cause the motor to output a torque gradually decreasing from the maximal torque for each prescribed period of time.

Once the motor has output the maximal torque the allowed number of times, the motor drive device decreases the motor's output torque from the maximal torque in steps. Thus the motor can maximally exhibit its ability to ensure dynamic performance.

Preferably, the drive circuit is an electric power converter having a plurality of switching elements switched to provide electric power conversion between the power supply and the motor, and the prescribed period of time is set to be shorter than a period of time that any of the plurality of switching elements, that continues to pass therethrough the current driving the motor corresponding to the maximal torque, requires to reach a prescribed tolerable temperature.

The motor drive device can thus prevent the inverter from having a particular switching element thereof overheated, while allowing the motor's maximal torque to be effectively utilized.

Preferably, the control device further includes means for obtaining an initial temperature of the drive circuit. The motor output limitation unit adjusts the allowed number of times in accordance with the initial temperature of the drive circuit as obtained.

The motor drive device allows the motor's maximal torque to be maximally utilized as long as preventing the drive circuit from overheating is ensured.

Preferably, the motor output limitation unit adjusts the allowed number of times to relatively decrease as the initial temperature of the drive circuit relatively increases.

The motor drive device allows the motor to output the maximal torque more often when the drive circuit is relatively low in temperature. Thus the motor can further exhibit its ability to ensure dynamic performance.

In accordance with the present invention when the motor is in an overload state the motor intermittently outputs a maximal torque that the motor can output within a range preventing the drive circuit from overheating. Thus the drive circuit can thermally be protected, while the motor's maximal torque can effectively be utilized. As a result, the motor can maximally exhibit its ability to ensure dynamic performance.

BEST MODES FOR CARRYING OUT THE INVENTION

Figure 1:
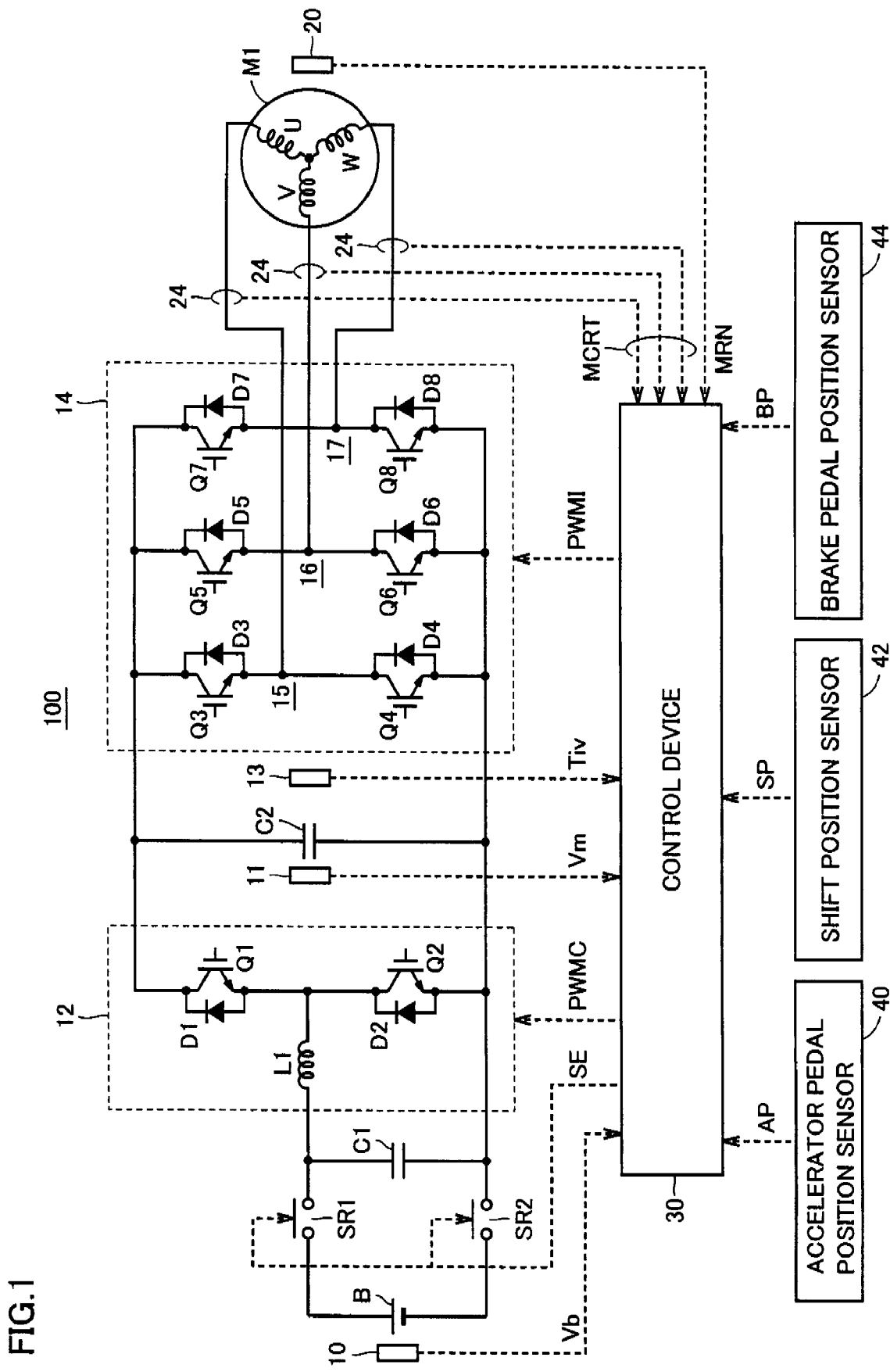
FIG. 1 is a schematic block diagram of a motor drive device of an embodiment of the present invention.

Hereinafter the present invention in an embodiment will now be described more specifically with reference to the drawings. In the figures, identical reference characters denote identical or like components.

FIG. 1 is a schematic block diagram of a motor drive device of the embodiment of the present invention.

With reference to FIG. 1 a motor drive device 100 includes a direct current power supply B, voltage sensors 10, 11, system relays SR1, SR2, capacitors C1, C2, an upconverter 12, an inverter 14, a current sensor 24, a temperature sensor 13, a speed sensor 20, and a control device 30.

An alternate current motor M1 is a drive motor for generating a torque for driving a drive wheel of a hybrid vehicle or an electric vehicle. Furthermore, alternate current motor M1 is a motor that has a function of a power generator driven by an engine (not shown) and operates as an electric motor for the engine to be capable for example of starting the engine.

Upconverter 12 includes a reactor L1, NPN transistors Q1, Q2, and diodes D1, D2.

Reactor L1 has one end connected to a power supply line of direct current power supply B, and the other end connected to a point intermediate between NPN transistor Q1 and NPN transistor Q2, i.e., between the emitter of NPN transistor Q1 and the collector of NPN transistor Q2.

NPN transistors Q1, Q2 are connected between a power supply line and an earth line in series. NPN transistor Q1 has its collector connected to the power supply line and NPN transistor Q2 has its emitter connected to the earth line. Furthermore, a diode D1 is provided between the collector and emitter of NPN transistor Q1 to pass a current from the emitter to the collector, and a diode D2 is provided between the collector and emitter of NPN transistor Q2 to pass a current from the emitter to the collector.

Inverter 14 is formed of a U phase arm 15, a V phase arm 16, and a W phase arm 17. U phase arm 15, V phase arm 16 and W phase arm 17 are provided between a power supply line and an earth line in parallel.

U phase arm 15 is formed of series connected NPN transistors Q3, Q4. V phase arm 16 is formed of series connected NPN transistors Q5, Q6. W phase arm 17 is formed of series connected NPN transistors Q7, Q8. Furthermore, a diode D3 is connected between the collector and emitter of NPN transistor Q3 to pass a current from the emitter to the collector. A diode D4 is connected between the collector and emitter of NPN transistor Q4 to pass a current from the emitter to the collector. A diode D5 is connected between the collector and emitter of NPN transistor Q5 to pass a current from the emitter to the collector. A diode D6 is connected between the collector and emitter of NPN transistor Q6 to pass a current from the emitter to the collector. A diode D7 is connected between the collector and emitter of NPN transistor Q7 to pass a current from the emitter to the collector. A diode D8 is connected between the collector and emitter of NPN transistor Q8 to pass a current from the emitter to the collector.

Each phase arm has an intermediate point connected to an end of a phase coil of alternate current motor M1. In other words, alternate current motor M1 is a 3 phase permanent magnet motor and configured with three U, V, W phase coils having their respective one ends connected commonly to a midpoint. The U phase coil has another end connected to a point intermediate between NPN transistors Q3, Q4. The V phase coil has another end connected to a point intermediate between NPN transistors Q5, Q6. The W phase coil has another end connected to a point intermediate between NPN transistors Q7, Q8.

While upconverter 12 and inverter 14 include switching elements implemented by NPN transistors Q1-Q8, they are not limited thereto and may be configured of IGBT (Insulated Gate Bipolar Transistor), MOSFET, or other similar power devices.

Direct current power supply B is a nickel metal hydride, lithium ion, or similar secondary battery. Voltage sensor 10 detects a voltage Vb output from direct current power supply B, and outputs the detected voltage Vb to control device 30. System relays SR1, SR2 are turned on/off by a signal SE issued from control device 30. More specifically, system relays SR1, SR2 are turned on and off by signal SE issued from control device 30 and having logically high and low levels, respectively.

Capacitor C1 receives direct current voltage from direct current power supply B, smoothes the received direct current voltage, and supplies the smoothed direct current voltage to upconverter 12.

Upconverter 12 receives the direct current voltage from capacitor C1, upconverts the received direct current voltage, and supplies the upconverted direct current voltage to capacitor C2. More specifically, when upconverter 12 receives a signal PWMC from control device 30, upconverter 12 upconverts the direct current voltage in accordance with a period for which NPN transistor Q2 is turned on by signal PWMC, and upconverter 12 supplies the upconverted direct current voltage to capacitor C2.

Furthermore, when upconverter 12 receives signal PWMC from control device 30, upconverter 12 downconverts direct current voltage supplied from inverter 14 via capacitor C2, and supplies the downconverted direct current voltage to direct current power supply B.

Capacitor C2 receives direct current voltage from upconverter 12, smoothes the received direct current voltage, and supplies the smoothed direct current voltage to inverter 14.

Voltage sensor 11 detects a voltage Vm across capacitor C2, which corresponds to a voltage input to inverter 14 and this will also be maintained hereinafter, and voltage sensor 11 outputs the detected voltage Vm to control device 30.

Temperature sensor 13 detects temperature Tiv of coolant water cooling inverter 14 (hereinafter also referred to as the inverter's coolant water temperature), and outputs the detected temperature Tiv to control device 30.

When inverter 14 receives direct current voltage from capacitor C2, inverter 14 operates in response to a signal PWMI received from control device 30 to convert the direct current voltage to alternate current voltage to drive alternate current motor M1. Alternate current motor M1 is thus driven to generate a required torque designated by a torque control value TR.

Furthermore, when a hybrid vehicle or electric vehicle having motor drive device 100 mounted therein is regeneratively braked, inverter 14 converts alternate current voltage that is generated by alternate current motor M1 into direct current voltage in response to signal PWMI issued from control device 30, and supplies the direct current voltage via capacitor C2 to upconverter 12.

Note that regenerative braking as referred to herein includes: braking accompanied by power regeneration when a driver of a hybrid vehicle or an electric vehicle operates the foot brake; not operating the foot brake, while releasing the accelerator pedal while the vehicle is running, to reduce vehicular speed (or stop acceleration) while providing power regeneration; and the like.

Current sensor 24 detects a motor current MCRT flowing to alternate current motor M1 and outputs the detected motor current MCRT to control device 30. Speed sensor 20 detects motor speed MRN of alternate current motor M1 and outputs the detected motor speed MRN to control device 30.

Control device 30 receives an accelerator pedal position AP from an accelerator pedal position sensor 40, a shift position SP from a shift position sensor 42, and a brake pedal position BP from a brake pedal position sensor 44. Furthermore, control device 30 receives direct current voltage Vb from voltage sensor 10, output voltage Vm from voltage sensor 11, motor current MCRT from current sensor 24, motor speed MRN from speed sensor 20, and the inverter's coolant water temperature Tiv from temperature sensor 13.

Control device 30 calculates a torque T* that alternate current motor M1 is required to output, as based on accelerator pedal position AP, shift position SP and brake pedal position BP. Hereinafter this torque will also be referred to as required torque T*.

Furthermore, control device 30 detects a driven state of alternate current motor M1, as based on motor speed MRN and motor current MCRT, by a method described later.

In accordance with the calculated required torque T* and the detected driven state of alternate current motor M1, control device 30 sets torque control value TR for driving alternate current motor M1.

Subsequently, control device 30 employs a method described later to generate signal PWMI based on the set torque control value TR, output voltage Vm, and motor current MCRT for controlling NPN transistors Q3-Q8 of inverter 14 to switch them when inverter 14 drives alternate current motor M1, and control device 30 outputs the generated signal PWMI to inverter 14.

Furthermore, when inverter 14 drives alternate current motor M1, control device 30 employs a method described later to generate signal PWMC based on direct current voltage Vb, output voltage Vm, torque control value TR and motor speed MN for controlling NPN transistors Q1, Q2 of upconverter 12 to switch them, and control device 30 outputs the generated signal PWMC to upconverter 12.

Furthermore, when a hybrid vehicle or an electric vehicle having motor drive device 100 mounted therein is regeneratively braked, control device 30 generates signal PWMI based on output voltage Vm, torque control value TR and motor current MCRT for converting the alternate current voltage that is generated by alternate current motor M1 into direct current voltage, and control device 30 outputs the generated signal PVMI to inverter 14. In that case, inverter 14 has NPN transistors Q3-Q8 switched as controlled by signal PWMI. Thus inverter 14 converts the alternate current voltage that is generated by alternate current motor M1 into direct current voltage, and inverter 14 supplies the direct current voltage to upconverter 12.

Furthermore, control device 30 in regeneratively braking generates signal PWMC based on direct current voltage Vb, output voltage Vm, torque control value TR and motor speed MRN for downconverting the direct current voltage received from inverter 14, and control device 30 outputs the generated signal PWMC to upconverter 12. Thus the alternate current voltage generated by alternate current motor M1 is converted to direct current voltage, downconverted and supplied to direct current power supply B.

Figure 2:
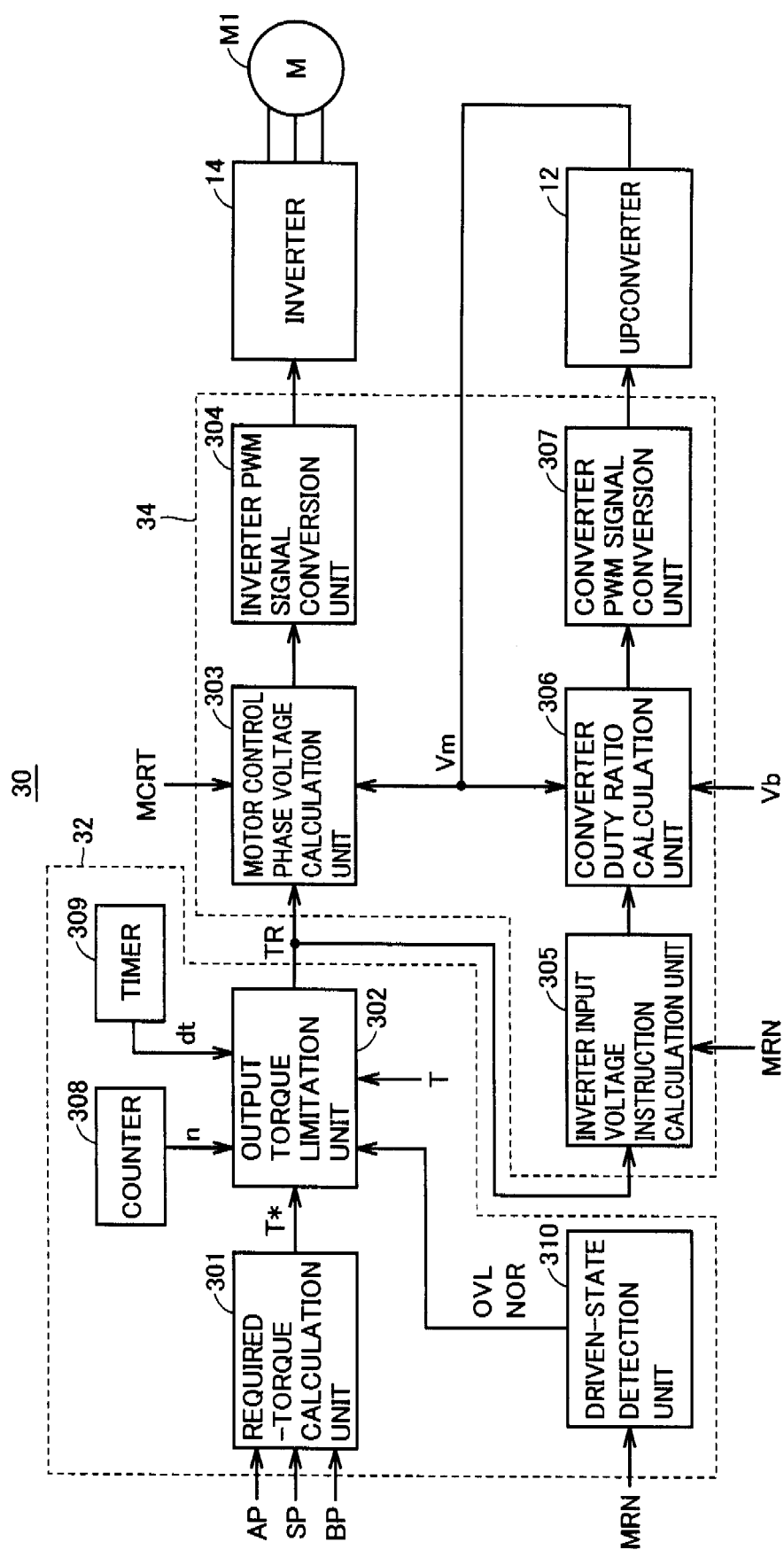
FIG. 2 is a functional block diagram of the control device shown in FIG. 1.

FIG. 2 is a functional block diagram of control device 30 shown in FIG. 1.

With reference to FIG. 2, control device 30 is configured of torque control value setting means 32 for setting torque control value TR for driving alternate current motor M1, and motor torque control means 34 for controlling inverter 14 and upconverter 12 to drive them to cause alternate current motor M1 to output a torque designated by torque control value TR.

More specifically, torque control value setting means 32 includes a required-torque calculation unit 301, an output torque limitation unit 302, a driven-state detection unit 310, a counter 308, and a timer 309.

Required-torque calculation unit 301 receives accelerator pedal position AP from accelerator pedal position sensor 40, shift position SP from shift position sensor 42, and brake pedal position BP from brake pedal position sensor 44, and in accordance with these input signals, required-torque calculation unit 301 calculates torque T* that alternate current motor M1 is required to output, and required-torque calculation unit 301 outputs the calculated, required torque T* to output torque limitation unit 302.

Driven-state detection unit 310 receives motor speed MRN from speed sensor 20 and motor current MCRT from current sensor 24, and from theses received signals, driven-state detection unit 310 determines whether alternate current motor M1 is in an overload state, and driven-state detection unit 310 outputs the decision to output torque limitation unit 302.

More specifically, if motor speed MRN is below a preset, predetermined speed and motor current MCRT exceeds a predetermined reference current, driven-state detection unit 310 determines that alternate current motor M1 is in an overload state overloading inverter 14, and driven-state detection unit 310 generates a signal OVL indicating the overload state and outputs the signal to output torque limitation unit 302.

Note that the predetermined speed is set at a speed in a vicinity of approximately zero to detect that alternate current motor M1 is locked, and thus stopped or rotates at a significantly low speed. Furthermore, when alternate current motor M1 is locked, and thus stopped or rotates at a significantly low speed, inverter 14 has continuously passing through a particular switching element a direct current exceeding an upper limit value of an alternate current flowing when alternate current motor M1 normally operates. Accordingly, the predetermined reference current is set at the value of a current higher than the upper limit value of the alternate current.

Furthermore, if motor speed MRN is at least the predetermined speed and/or motor current MCRT is at most the predetermined reference current, driven-state detection unit 310 determines that alternate current motor M1 is in normal state, and driven-state detection unit 310 generates a signal NOR indicating the normal state and outputs the signal to output torque limitation unit 302.

When output torque limitation unit 302 receives required torque T* from required-torque calculation unit 301 and signal NOR or OVL from driven-state detection unit 310, output torque limitation unit 302 sets torque control value TR in accordance with required torque T* and the driven state of alternate current motor M1.

More specifically, if a decision is made from signal NOR received from driven-state detection unit 301 that alternate current motor M1 is in normal state, output torque limitation unit 302 does not limit an output torque, as will be described later, and instead outputs required torque T* to motor torque control means 34 as torque control value TR for driving alternate current motor M1.

If a decision is made from signal OVL received from driven-state detection unit 310 that alternate current motor M1 is in the overload state, then output torque limitation unit 302 employs a method described hereinafter to set torque control value TR to limit a torque output from alternate current motor M1, and output the set torque control value TR to motor torque control means 34.

Figure 3:
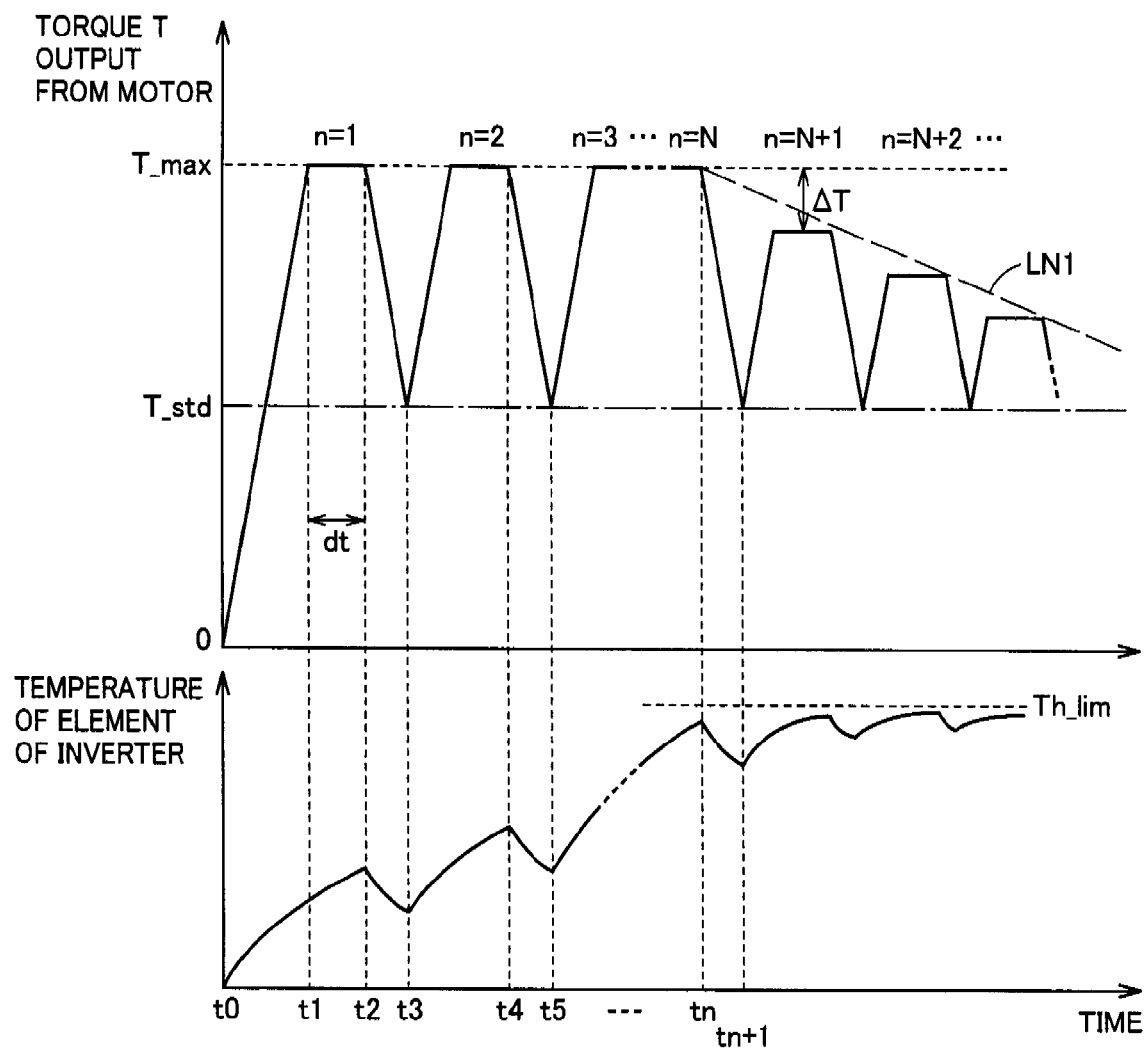
FIG. 3 is timing plots for illustrating a method of controlling an output torque in an embodiment of the present invention.

FIG. 3 is timing plots for illustrating a method of controlling an output torque in the embodiment of the present invention.

If alternate current motor M1 is in the overload state, output torque limitation unit 302 sets torque control value TR to cause alternate current motor M1 to intermittently output a maximal torque T_max that alternate current motor M1 can output (hereinafter also referred to as the maximal torque), as shown in FIG. 3.

More specifically, in alternate current motor M1, a so called current-control is normally performed to convert torque control value TR set as based on a required torque into a current-instruction value of d- and q-axis components of alternate current motor M1, and provide feedback by proportional-integral control to allow an actual motor current MCRT to match the current-instruction value. For larger required torque, alternate current motor M1 has higher motor current MCRT passing therethrough, and when motor current MCRT reaches a maximal current that alternate current motor M1 can pass, alternate current motor M1 outputs maximal torque T_max.

Herein if the vehicle is ditched or the like and the motor is locked, a particular switching element of inverter 14 controlling alternate current motor M1 to drive it will have passing therethrough intensively a direct current significantly exceeding an alternate current flowing in normal operation. The particular switching element may rapidly elevates in temperature and thus be damaged.

Accordingly, conventionally, an output torque is decreased from the maximal torque of alternate current motor M1 to a torque output from alternate current motor M1 when a maximal direct current that the particular switching element can continuously tolerate is passed, i.e., a torque that can continuously be output, to prevent the particular switching element from elevating in temperature.

However, when alternate current motor M1 is locked, the vehicle's driver may further depress the accelerator pedal to increase force driving the vehicle to attempt to escape from the locked state. If at the time the output torque is immediately decreased, as has been previously described, the force driving the vehicle, as desired, cannot be obtained and the vehicle cannot escape from the locked state. To prevent such disadvantage, it is desirable to utilize an ability of alternate current motor M1 to cause alternate current motor M1 to positively output the maximal torque.

Causing alternate current motor M1 to continuously output the maximal torque, however, may pass an excessive current continuously through a particular switching element of inverter 14. This may elevate the element's temperature rapidly and thermally destroy the element.

Accordingly the present invention provides output torque limitation unit 302 configured to cause alternate current motor M1 to intermittently output a maximal torque if alternate current motor M1 is in an overload state overloading inverter 14. This can prevent a particular switching element from rapidly elevating in temperature and also ensure dynamic performance required to escape from locked state.

More specifically, with reference to FIG. 3, at time t=0, that alternate current motor M1 is in an overload state is detected. In response, output torque limitation unit 302 sets torque control value TR for driving alternate current motor M1 to output maximal torque T_max from time t1 to time t2, i.e., for a prescribed period of time dt. Thus an output torque T exhibits maximal torque T_max only for the prescribed period of time dt, and once the prescribed period of time dt has elapsed or time t2 has arrived, output torque T gradually decreases.

Note that the prescribed period of time dt is set to be shorter than a period of time that a particular switching element continuing to pass motor current MCRT corresponding to maximal torque T_max requires to reach a tolerable temperature. More specifically, for example, output torque limitation unit 302 may accumulate motor current MCRT received from current sensor 24 for the prescribed period of time dt, and from the cumulative value may estimate the temperature of a switching element of inverter 14 attained when the prescribed period of time dt elapses, and the prescribed period of time dt can be controlled to allow the element's estimated temperature to be below the tolerable temperature.

Alternatively, to facilitate control, it may be set to be a fixed period of time determined with how much motive force the motor generates and how much an element elevates in temperature taken into consideration. The prescribed period of time dt is counted by timer 309.

Output torque T decreases, and at time t3 if a decision is made that a prescribed threshold value T_std has been reached, then output torque limitation unit 302 again sets torque control value TR to cause alternate current motor M1 to output maximal torque T_max for the prescribed period of time dt, and once the prescribed period of time dt has elapsed, output torque limitation unit 302 responsively again decreases output torque T to the prescribed threshold value T_std. Note that the prescribed threshold value T_std is set at the torque that alternate current motor M1 can continuously output.

Furthermore, while output torque limitation unit 302 causes alternate current motor M1 to repeat outputting maximal torque T_max and decreasing output torque T, as described above, counter 308 counts how many times alternate current motor M1 outputs maximal torque T_max. If a decision is made that at time tn, counter 308 has counted a value n reaching a preset, predetermined allowed number of times, which is set as N times in FIG. 3, wherein N is an integer of at least two, then output torque limitation unit 302 stops intermittently outputting maximal torque T_max, as described above.

Herein the predetermined allowed number of times N is set, with how much a particular switching element of inverter 14 elevates in temperature previously taken into consideration, and the predetermined allowed number of times N thus set is stored in output torque limitation unit 302 at an internal storage area. As shown in FIG. 3, the switching element of inverter 14 increases in temperature as motor current MCRT increases as output torque T increases, and the switching element of inverter 14 decreases in temperature as motor current MCRT decreases as output torque T decreases, and as output torque limitation unit 302 repeats increasing and decreasing output torque T between maximal torque T_max and torque T_std that can continuously be output, the switching element repeats increasing and decreasing in temperature and thus gradually elevates in temperature. Output torque limitation unit 302 has a prescribed tolerable temperature Th_lim for the temperature of the switching element, and sets up to how many times maximal torque T_max may be output within a range in which the switching element does not reach tolerable temperature Th_lim.

Thus the present invention allows alternate current motor M1 to output maximal torque T_max as long as a switching element does not reach tolerable temperature Th_lim. This can prevent the switching element from overheating, while allowing alternate current motor M1 to maximally exhibit its ability to ensure dynamic performance.

Furthermore, the present invention provides output torque limitation unit 302 that is configured to set torque control value TR to cause alternate current motor M1 to intermittently output a torque that is gradually decreased from maximal torque T_max once maximal torque T_max has been output an allowed number of times (which, in FIG. 3, is N times).

More specifically, in FIG. 3 at time tn, when count value n=N is reached, output torque limitation unit 302 sets torque control value TR to cause alternate current motor M1 to output maximal torque T_max minus ΔT only for the prescribed period of time dt, and after the prescribed period of time dt has elapsed when output torque T decreases and thus has reached the prescribed threshold value (or torque that can continuously be output) T_std, output torque limitation unit 302 causes alternate current motor M1 to output the immediately preceding output torque (=T_max−ΔT) further minus ΔT i.e., a torque (=T_max−2·ΔT) for the prescribed period of time dt. Thus, once maximal torque T_max has been output the allowed number of times N, alternate current motor M1 intermittently outputs maximal torque T_max decremented by ΔT. At the time, the switching element repeats gently increasing and decreasing in temperature to converge to a predetermined temperature lower than tolerable temperature Th_lim.

Thus after alternate current motor M1 has output maximal torque T_max an allowed number of times, alternate current motor M1 still continues to output a torque gradually decreased from maximal torque T_max. This allows alternate current motor M1 to exhibit its ability further better than when output torque T is immediately decreased from maximal torque T_max after time tn. As a result, dynamic performance can further be ensured.

Again with reference to FIG. 2, when motor torque control means 34 receives torque control value TR from output torque limitation unit 302, motor torque control means 34 controls inverter 14 and upconverter 12 to drive them to output a torque designated by torque control value TR.

More specifically, motor torque control means 34 includes a motor control phase voltage calculation unit 303, an inverter PWM signal conversion unit 304, an inverter input voltage instruction calculation unit 305, a converter duty ratio calculation unit 306, and a converter PWM signal conversion unit 307.

Motor control phase voltage calculation unit 303 receives: voltage Vm output from upconverter 12, i.e., voltage input to inverter 14, from voltage sensor 11; motor current MCRT from current sensor 24; and torque control value TR from output torque limitation unit 302. Motor control phase voltage calculation unit 306 uses a torque control value TR1, motor current MCRT and output voltage Vm to calculate voltage applied to the coil of each phase of alternate current motor M1 and output the resultant calculation to inverter PWM signal conversion unit 304.

Inverter PWM signal conversion unit 304 uses the resultant calculation received from motor control phase voltage calculation unit 303 to generate signal PWMI turning on/off each NPN transistor Q3-Q8 of inverter 14 and output the generated signal PWMI to each NPN transistor Q3-Q8 of inverter 14. If driven-state detection unit 310 detects that alternate current motor M1 is in the overload state, inverter PWM signal conversion unit 304 outputs the generated signal PWMI to each NPN transistor Q3-Q8 of inverter 14 only for the prescribed period of time dt.

Thus inverter 14 has each NPN transistor Q3-Q8 controlled to switch to control a current passed through each phase of alternate current motor M1 to allow alternate current motor M1 to output a torque as designated. Thus a current driving the motor is controlled and a torque corresponding to torque control value TR is output.

Furthermore, if alternate current motor M1 is in the overload state, alternate current motor M1 outputs maximal torque T_max for each prescribed period of time dt intermittently. Once maximal torque T_max has been output an allowed number of times, a torque gradually decreased from maximal torque T_max is output for each prescribed period of time dt intermittently.

Inverter input voltage instruction calculation unit 305 determines an optimal value (or target value) for voltage input to the inverter, i.e., a voltage control value Vdc_com for upconverter 12, as based on torque control value TR received from output torque limitation unit 302 and motor speed MRN received from speed sensor 20, and outputs the determined voltage control value Vdc_com to converter duty ratio calculation unit 306.

When converter duty ratio calculation unit 306 receives voltage control value Vdc_com from inverter input voltage instruction calculation unit 305 and direct current voltage Vb from voltage sensor 10, converter duty ratio calculation unit 306 calculates a duty ratio DR, as based on direct current voltage Vb, for setting voltage Vm input to inverter 14 at voltage control value Vdc_com. Converter duty ratio calculation unit 306 outputs the calculated duty ratio DR to converter PWM signal conversion unit 307.

Converter PWM signal conversion unit 307 uses duty ratio DR received from converter duty ratio calculation unit 306 to generate signal PWMC for turning on/off NPN transistors Q1, Q2 of upconverter 12 and output the generated signal PWMC to upconverter 12.

Figure 4:
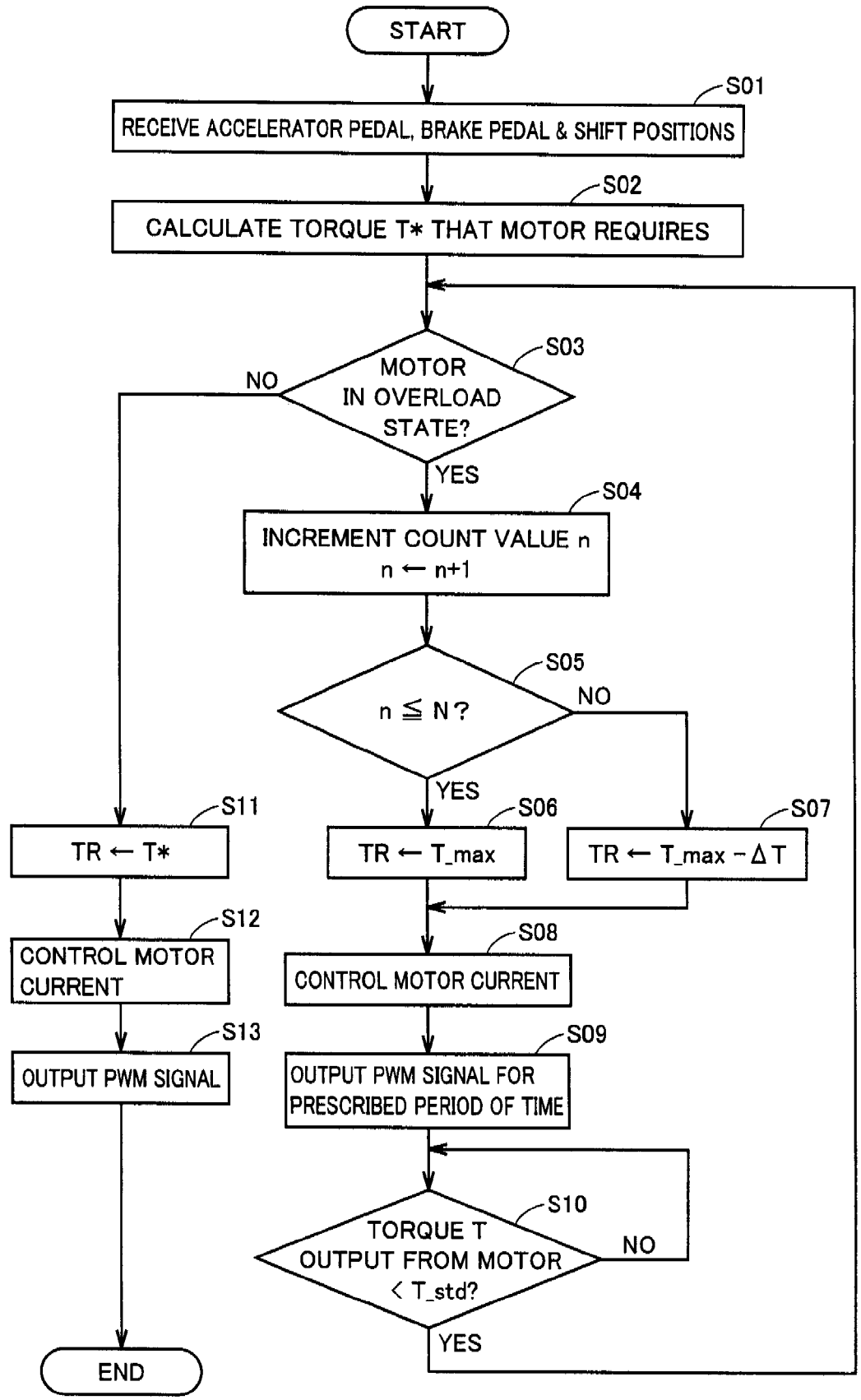
FIG. 4 is a flowchart for illustrating limiting an output torque in an embodiment of the present invention.

FIG. 4 is a flowchart for illustrating limiting an output torque in an embodiment of the present invention.

With reference to FIG. 4, required-torque calculation unit 301 receives accelerator pedal position AP, brake pedal position BP and shift position SP from sensors 40, 42, 44 (step S01). From these input signals, required-torque calculation unit 301 calculates torque T* that alternate current motor M1 requires, and required-torque calculation unit 301 outputs the calculated required torque T* to output torque limitation unit 302 (step S02).

Driven-state detection unit 310 determines from motor speed MRN and motor current MCRT whether alternate current motor M1 is in the overload state (step S03). If so, driven-state detection unit 310 responsively generates and outputs signal OVL to output torque limitation unit 302. If a decision is made that alternate current motor M1 is in normal state, driven-state detection unit 310 responsively generates and outputs signal NOR to output torque limitation unit 302.

When output torque limitation unit 302 receives signal OVL, output torque limitation unit 302 sets torque control value TR to cause alternate current motor M1 to output maximal torque T_max only the allowed number of times N intermittently in accordance with the method described with reference to FIG. 3.

More specifically, when output torque limitation unit 302 receives signal OVL, output torque limitation unit 302 increments count value n of counter 308 to be n+1 (step S04), and output torque limitation unit 302 determines whether the incremented count value n is at most the allowed number of times N (step S05).

If at step S05 a decision is made that count value n is at most the allowed number of times N, output torque limitation unit 302 outputs maximal torque T_max of alternate current motor M1 as torque control value TR to motor torque control means 34 for the prescribed period of time dt (step S06).

When motor torque control means 34 receives torque control value TR, motor torque control means 34 generates signal PWMI, as based on torque control value TR, motor current MCRT and output voltage Vm, for turning on/off each NPN transistor Q3-Q8 of inverter 14 to cause alternate current motor M1 to output maximal torque T_max (step S08), and motor torque control means 34 outputs the generated signal PWMI to each NPN transistor Q3-Q8 of inverter 14 only for the prescribed period of time dt (step S09).

Thus inverter 14 has each NPN transistor Q3-Q8 controlled to switch to control a current passed through each phase of alternate current motor M1 to output maximal torque T_max. Thus a current driving the motor is controlled and alternate current motor M1 outputs a torque that corresponds to torque control value TR for the prescribed period of time dt.

Once the prescribed period of time dt has elapsed and output torque T decreases and thus has reached the prescribed threshold value (a torque that can continuously be output) T_std (step S10), the control again returns to step S03 to make a decision on whether alternate current motor M1 has escaped from the overload state. If a decision is made that alternate current motor M1 is still in the overload state, then output torque limitation unit 302 goes to steps S04 and S05 to determine whether count value n incremented is at most the allowed number of times N. If so, output torque limitation unit 302 sets maximal torque T_max as torque control value TR (step S06). Thus, alternate current motor M1 is controlled to be driven to again output maximal torque T_max only for the prescribed period of time dt (steps S08-S010).

If a decision is made that count value n has exceeded the allowed number of times N, output torque limitation unit 302 goes to step S07 and sets maximal torque T_max decreased by ΔT, i.e., torque T_max−ΔT, as a new torque control value TR (step S07), and steps S08-S010 are performed to cause alternate current motor M1 to output a torque smaller than maximal torque T_max by ΔT for the prescribed period of time dt.

A series of operations indicated above in steps S03-S10 continues until alternate current motor M1 escapes from the overload state, and when a decision is made that alternate current motor M1 has escaped from the overload state, output torque limitation unit 302 no longer performs such output torque limitation, and instead outputs required torque T* as torque control value TR (step S11). Thus motor torque control means 34 controls a current passed through each phase of alternate current motor M1 to cause alternate current motor M1 to output required torque T* (steps S12, S13). As a result, alternate current motor M1 outputs required torque T* in accordance with the driver's operation.

Variation

Alternate current motor M1 is allowed to output maximal torque T_max the allowed number of times N, which is set, with how much a particular switching element of inverter 14 elevates in temperature previously taken into account, and the allowed number of times N thus set is stored in output torque limitation unit 302 at a storage area, as has been previously described.

If the allowed number of times N is configured to be variable with an initial temperature of a switching element of inverter 14, maximal torque T_max can be utilized further effectively to enhance alternate current motor M1 in dynamic performance.

More specifically, output torque limitation unit 32 detects the inverter's coolant water temperature Tiv received from temperature sensor 13 as the temperature of an ambient of motor drive device 100, and estimates the detected temperature of the ambient of motor drive device 100 as an initial temperature of a switching element of inverter 14.

Figure 5:
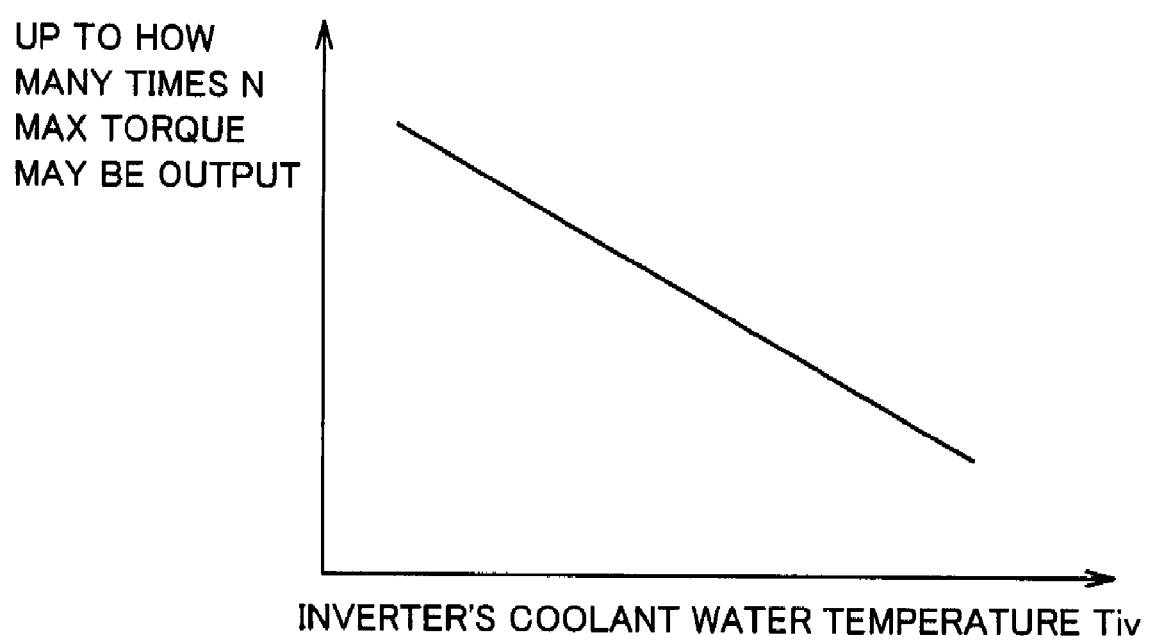
FIG. 5 shows a relationship between the temperature of coolant water for an inverter and up to how many times an alternate current motor is allowed to output a maximal torque.

Output torque limitation unit 302 sets a relationship, as shown in FIG. 5, between the inverter's coolant water temperature Tiv, i.e., the value of the initial temperature of the switching element of inverter 14 as estimated, and up to how many times alternate current motor M1 is allowed to output maximal torque T_max, and output torque limitation unit 302 previously holds this relationship as a map. More specifically, with reference to FIG. 5, the allowed number of times N is set to be smaller for higher temperature Tiv, i.e., for higher initial temperature of the switching element. When output torque limitation unit 302 receives temperature Tiv from temperature sensor 13, output torque limitation unit 302 refers to the map to determine the allowed number of times N that corresponds to temperature Tiv detected.

Thus outputting maximal torque T_max the allowed number of times N that is variable with an initial temperature of a switching element allows maximal torque T_max to be more effectively utilized while preventing a switching element from overheating. More specifically if the inverter's coolant water temperature Tiv is relatively low, i.e., if the switching element has an initial temperature estimated to be relatively low, alternate current motor M1 is allowed to output maximal torque T_max a larger number of times to enhance alternate current motor M1 in dynamic performance while holding the switching element's temperature within tolerable temperature Th_lim.

If the inverter's coolant water temperature Tiv is relatively high, i.e., if the switching element has an initial temperature estimated to be relatively high, alternate current motor M1 is controlled to output maximal torque T_max a limited, smaller number of times. This can ensure that inverter 14 can be prevented from having a switching element overheated while maximal torque T_max can be utilized maximally.

Figure 6:
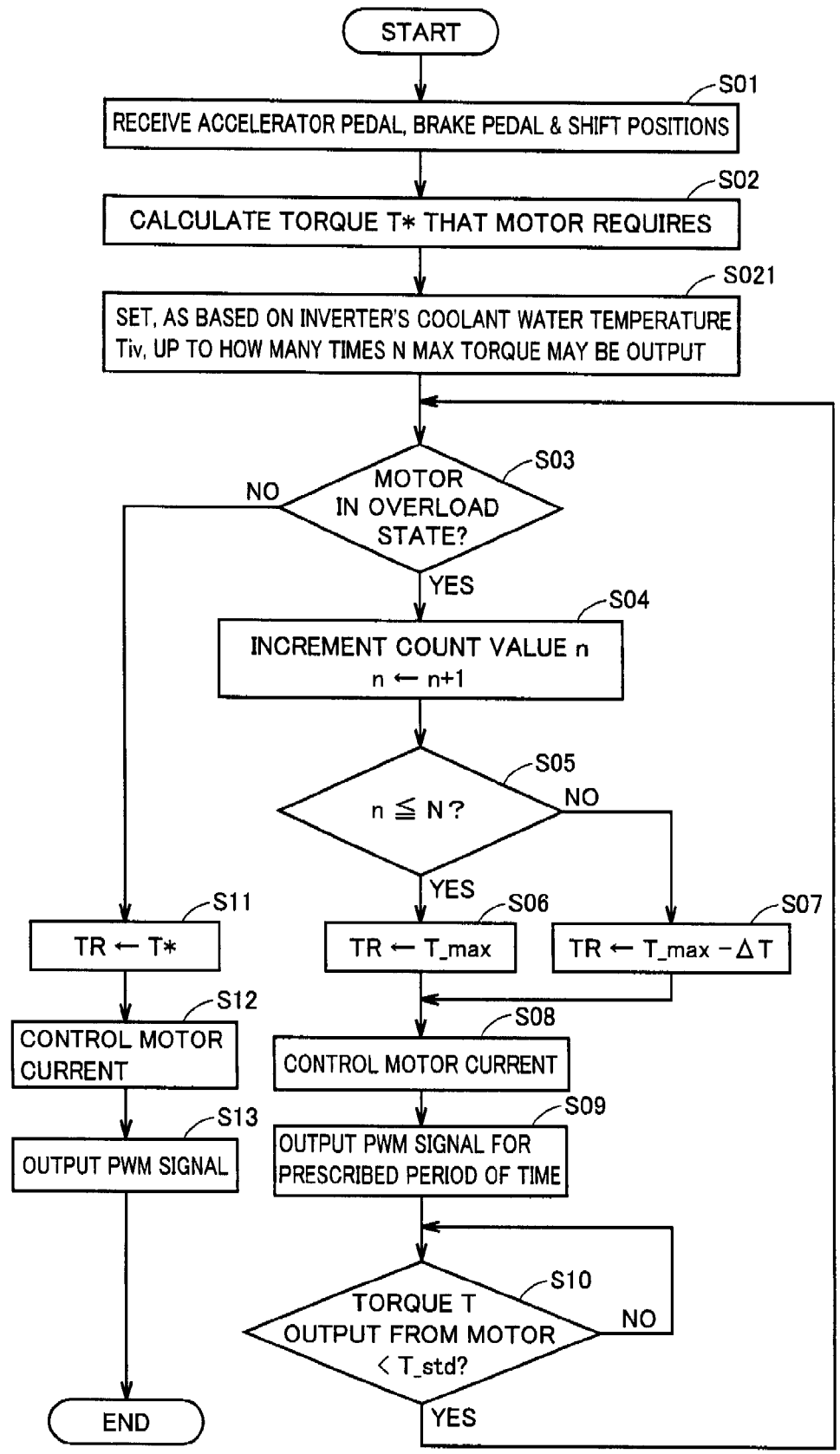
FIG. 6 is a flowchart for illustrating limiting an output torque in an exemplary variation of the embodiment of the present invention.

FIG. 6 is a flowchart for illustrating limiting an output torque in an exemplary variation of the embodiment of the present invention. The FIG. 6 flowchart corresponds to the FIG. 4 flowchart having steps S02 and S03 with an additional step S021 added therebetween. Accordingly the overlapping steps, i.e., steps S01-S13, will now be described repeatedly in detail.

With reference to FIG. 6 at step S021 output torque limitation unit 302 receives required torque T* from required-torque calculation unit 301, signal NOR or OVL from driven-state detection unit 310, and the inverter's coolant water temperature Tiv, as detected, from temperature sensor 13, and output torque limitation unit 302 refers to the previously stored FIG. 5 map to determine up to how many times N, as corresponding to the inverter's coolant water temperature Tiv, maximal torque T_max may be output.

Thus if driven-state detection unit 310 detects in step S03 that alternate current motor M1 is in the overload state, output torque limitation unit 302 follows steps S04-S07 to set torque control value TR to cause alternate current motor M1 to output maximal torque T_max within the range of the allowed number of times N as determined, and if a decision is made that maximal torque T_max is output a number of times n exceeding the allowed number of times N, output torque limitation unit 302 sets torque control value TR to decrease output torque T gradually from maximal torque T_max.

Thus in an embodiment of the present invention when an alternate current motor is in an overload state the alternate current motor is allowed to output a maximal torque as long as that an inverter has a particular switching element thereof thermally protected is ensured. This can avoid inviting overheating the particular switching element, while allowing the alternate current motor to maximally exhibit its ability to ensure dynamic performance.

Note that in the present invention, output torque limitation unit 302 configures a "motor output limitation unit," and driven-state detection unit 310 configures an "overload state detection unit".

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present invention is applicable to motor drive devices mounted in hybrid vehicles or electric vehicles.

The invention claimed is:

1. A motor drive device comprising:
a power supply;
a drive circuit receiving electric power from said power supply to drive a motor; and
a control device controlling said drive circuit to match an output of said motor to a target torque, said control device including
an overload state detection unit detecting an overload state of said motor from a speed of said motor and a current driving said motor, and
a motor output limitation unit operative in response to the overload state of said motor being detected to limit a torque output from said motor,
said motor output limitation unit setting said target torque to cause said motor to output a maximal torque for a preset limited number of time intervals.

2. The motor drive device according to claim 1, wherein said motor output limitation unit sets said target torque to cause said motor to output said maximal torque for each prescribed time interval within a predetermined number of time intervals.

3. The motor drive device according to claim 2, wherein said motor output limitation unit presets said limited number of time intervals so as to prevent said drive circuit from exceeding a prescribed tolerable value in temperature.

4. The motor drive device according to claim 3, wherein when a decision is made that said motor has output said maximal torque said preset limited number of time intervals, said motor output limitation unit sets said target torque to cause said motor to output a torque gradually decreasing from said maximal torque for each said prescribed time interval.

5. The motor drive device according to claim 4, wherein:
said drive circuit is an electric power converter having a plurality of switching elements switched to provide electric power conversion between said power supply and said motor; and
said prescribed time interval is set to be shorter than a time interval that any of said plurality of switching elements, that continues to pass therethrough said current driving said motor corresponding to said maximal torque, requires to reach a prescribed tolerable temperature.

6. The motor drive device according to claim 1, wherein:
said control device obtains an initial temperature of said drive circuit; and
said motor output limitation unit adjusts said preset limited number of time intervals in accordance with the initial temperature of said drive circuit as obtained.

7. The motor drive device according to claim 6, wherein said motor output limitation unit adjusts said preset limited number of time intervals to relatively decrease as the initial temperature of said drive circuit relatively increases.

8. The motor drive device according to claim 1, wherein the preset limited number of time intervals at which the maximal torque is output are intermittent.

* * * * *